United States Patent [19]

Griser et al.

[11] Patent Number: 5,395,557
[45] Date of Patent: Mar. 7, 1995

[54] METHOD AND APPARATUS FOR APPLYING GEL TO A PLURALITY OF OPTICAL FIBERS

[75] Inventors: Anthony A. Griser, Newton; Jeffrey S. Barker, Hickory, both of N.C.

[73] Assignee: Alcatel NA Cable Systems, Inc., Claremont, N.C.

[21] Appl. No.: 114,778

[22] Filed: Aug. 31, 1993

[51] Int. Cl.⁶ .............................. B29D 11/00
[52] U.S. Cl. ...................... 264/1.28; 264/174; 425/114; 425/133.1; 427/163.2
[58] Field of Search .......... 427/163; 385/102, 107, 385/115; 264/174, 210.1, 1.24, 1.28, 1.29; 425/113, 114, 133.1

[56] References Cited

U.S. PATENT DOCUMENTS

| | | | |
|---|---|---|---|
| 3,556,635 | 1/1971 | Schrenk et al. | 264/1.5 |
| 4,098,926 | 7/1978 | Nothe | 264/1.5 |
| 4,154,783 | 5/1979 | Jackson | 264/1.5 |
| 4,246,299 | 1/1981 | Ohls | 427/163 |
| 4,264,649 | 4/1981 | Claypoole et al. | 427/163 |
| 4,349,587 | 9/1982 | Aloisio, Jr. et al. | 427/163 |
| 4,409,154 | 10/1983 | Grenat | 264/1.5 |
| 4,474,638 | 10/1984 | Einsle | 264/1.5 |
| 4,810,429 | 3/1989 | Mayr | 427/163 |
| 4,985,185 | 1/1991 | Mayr et al. | 264/1.5 |

*Primary Examiner*—Mathieu Vargot
*Attorney, Agent, or Firm*—Ware, Fressola, Van Der Sluys & Adolphson

[57] ABSTRACT

An apparatus (10) for applying gel to a plurality of optical fibers (18) includes a housing (12) having a cavity (14) through which a plurality of separated optical fibers (18) are fed. The gel is provided to the cavity (14) from a gel reservoir (76) via a pump (74) that maintains the pressure and gel level to ensure that the optical fibers (18) are coated with gel to eliminate air gaps and thus prevent sticking among the optical fibers (18).

26 Claims, 3 Drawing Sheets

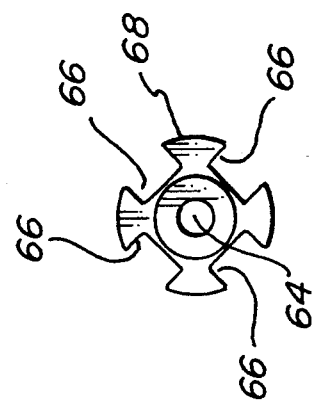
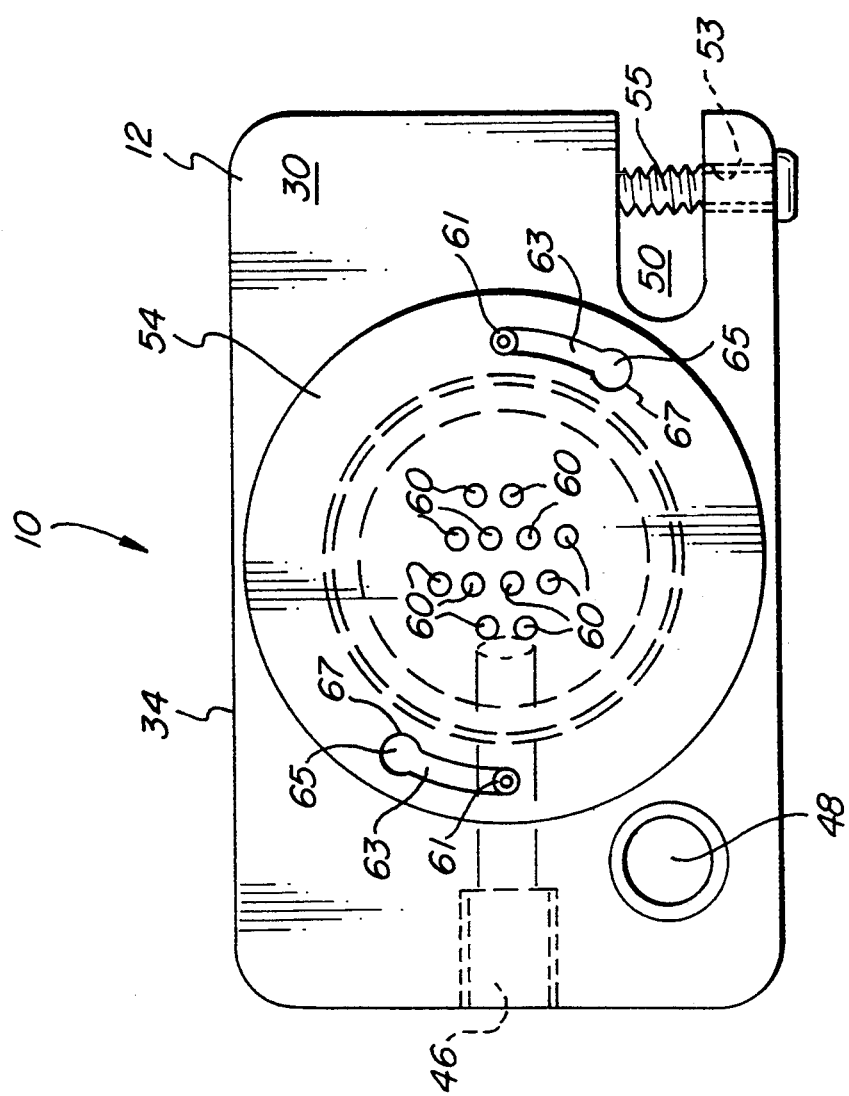

METHOD AND APPARATUS FOR APPLYING GEL TO A PLURALITY OF OPTICAL FIBERS

BACKGROUND OF THE INVENTION

1. Field of the Invention

The present invention generally relates to an apparatus for applying a gel to a plurality of optical fibers and, in particular, relates to one such apparatus having means for injecting a gel into a cavity having a plurality of separated optical fibers extending therethrough such that each of the optical fibers is coated with the gel.

2. Description of the Prior Art

In the manufacture of fiber optic cables, optical fibers are first collected into fiber optic bundles. The bundles are then wound together to form the fiber optic cable. Typically, during the formation of the fiber optic bundles a plurality of optical fibers are passed through an extrusion cross head. As the fibers are passed through the extrusion cross head, heat is applied to the fibers and a plastic tube is extruded around the fibers to contain the optical fibers as a bundle. One major difficulty encountered during this process is that the heat required for applying the sheath can soften the thermoplastic ink coating on the optical fibers causing the fibers to adhere, or stick, to each other. Such sticking can result in a catastrophic transmission loss of the optical fibers and thus lead to a failure of the resultant fiber optic cable.

It is generally accepted practice in the industry, therefore, to apply some form of filling compound to the optical fibers prior to passing the optical fibers through the extrusion cross head. Historically, the application of filling compounds has been largely unsuccessful.

Conventional techniques for applying a filling compound exhibit numerous drawbacks. For example, failure to maintain a sufficient level of filling compound in the application cavity or failure to maintain adequate pressure in the cavity can result in air gaps created within the fiber optic bundle and thus allowing the fibers to adhere to each other. Further, when a higher pressure is applied or a high viscosity material is used, the drawing tension has increased to an unsafe level during the extrusion of the tube around the optical fibers. A further difficulty is that the alignment of the output of the filling compound application unit with the extrusion cross head is crucial. If the filling compound application unit and the extrusion cross head are not precisely aligned, the optical fibers are dragged on the extrusion cross head entrance thus causing damage to the optical fibers.

Another conventional technique for avoiding the sticking of optical fibers during the formation of the bundles is the use of an oil applicator. Typically, such techniques lubricate the surfaces of the separated optical fibers with a low molecular weight oil. However, such oils often evolve off the fiber with the application of heat by the extrusion cross head. Hence, the oil dissipates before the optical fibers cool and the optical fibers stick to each other. Further, the chemical interaction between the selected oil and the thermoplastic ink coating on the optical fiber can be difficult to match to avoid sticking among the fibers. In addition, the quantity of oil entering the buffer tube is also difficult to control.

Other techniques are known in the industry and each exhibits at least one or more of the above-recited drawbacks.

Consequently, an apparatus for applying gel to a plurality of optical fibers that substantially completely overcomes the above-recited drawbacks is highly desirable and sorely needed in the optical fiber industry.

SUMMARY OF THE INVENTION

Accordingly, it is one object of the present invention to provide an apparatus for applying gel to a plurality of optical fibers that substantially completely overcomes the above-recited drawbacks.

This object is accomplished, at least in part, by an apparatus having means for injecting a gel into a cavity having a plurality of separated optical fibers extending therethrough such that each of the optical fibers is coated with the gel and sticking of the optical fibers is prevented.

Other objects and advantages of the present invention will become apparent from the following detailed description of the invention read in conjunction with the appended claims and the drawings attached hereto.

BRIEF DESCRIPTION OF THE DRAWINGS

The drawings, not drawn to scale, include:

FIG. 2 which is an end view of an apparatus for applying gel to a plurality of optical fibers;

FIG. 3 which is an end view of a spline member particularly useful in conjunction with an apparatus for applying gel to a plurality of optical fibers.

DETAILED DESCRIPTION OF THE PRESENT INVENTION

Figure 1:
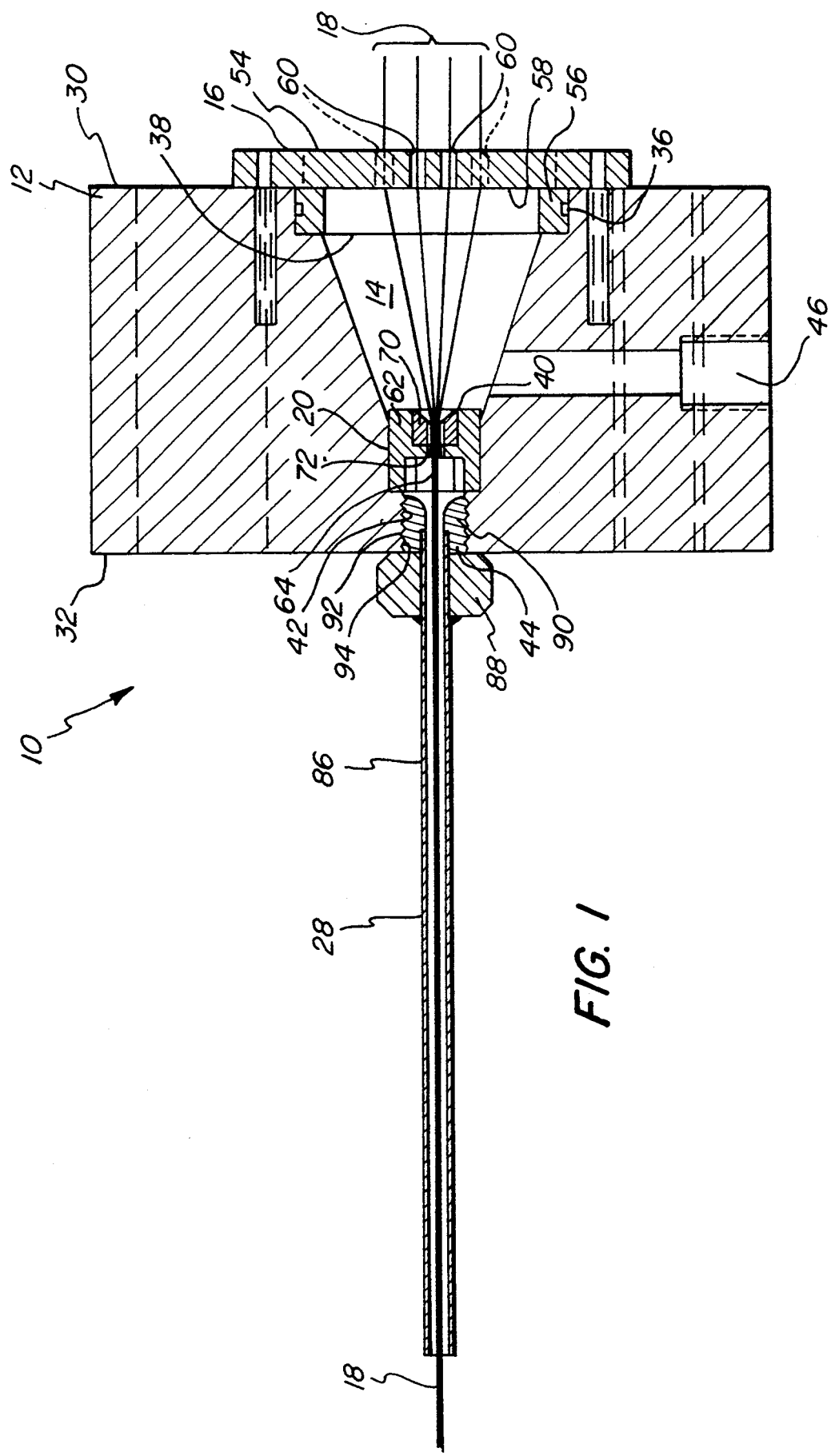
FIG. 1 which is a cross-sectional view of an apparatus for applying gel to a plurality of optical fibers embodying the principles.

An apparatus for applying gel to a plurality of optical fibers, generally indicated at 10 in the FIGURES and embodying the principles of the present invention, includes a housing 12 having a cavity 14 therein, means 16 for guiding and separating a plurality of optical fibers 18 into the cavity 14, means 20 for guiding the optical fibers 18 out of the cavity 14, and means 22 for injecting a gel into the cavity 14 such that each optical fiber 18 is coated with the gel.

Preferably, the apparatus 10 also includes means 24 for aligning the apparatus 10 with an extrusion cross head 26 and means 28 for injecting the plurality of optical fibers 18 into the extrusion cross head 26.

In the embodiment shown, the housing 12 includes first and second end walls, 30 and 32, respectively, and sidewalls 34. The housing 12 also includes a recess 36 extending into the first end wall 30 and adapted to interface with the means 16 for separating the plurality of optical fibers 18 The recess 36 terminates at the first end 38 of the cavity 14. The cavity 14, in this embodiment has a generally circular cross-section along the length thereof and has a comparatively larger cross-section at the first end 38 and a comparatively smaller cross-section at the second end 40 thereof. Preferably, although not necessarily, the cavity 14 is linearly tapered between the first and second ends, 38 and 40, thereof. Further, the second end of the cavity 14 is adapted to interface with the means 20 for guiding the optical fibers 18 out of the cavity 14.

In the preferred embodiment, the housing 12 includes an opening 42 extending into the second end wall 32 thereof. The opening 42 is sized to accept one end 44 of the means 28 for injecting the optical fibers 18 into the extrusion cross head 26. Further, the housing is provided with a passageway 46 for gel to be injected into the cavity 14 by the means 28 for injecting gel. Typically, the passageway 46 is a machined opening extending from a sidewall 34 of the housing 12 and terminating at the cavity 14 within the housing 12. Thus the passageway 46 serves as a flow conduit for the gel.

In the such an embodiment, as shown in FIG. 2, the housing 12 also includes a through-bore 48 and a slot 50. The through-bore 48 and the slot 50 are spaced apart on opposite sides of the cavity 14 and extend between the first and second end walls, 30 and 32, respectively, of the housing 12. Further, the through-bore 48 and the slot 50 are disposed to receive a pair of alignment rods 52, shown in FIG. 4, that are affixed to the extrusion cross head 26. The through-bore 48 and the slot 50 in conjunction with the alignment rods 52 provide the means 24 for aligning the housing 12 with the extrusion cross head 26. As shown in FIG. 2 an internally threaded opening 53 can be provided through a side wall 34 through which an externally threaded retention pin 55 can be fitted such that it extends across the slot 50 to retain the housing on the alignment rod 52.

As shown in FIGS. 1 and 2, the means 16 for separating the plurality of optical fibers 18 includes a faceplate 54 having a collar 56 extending from one side 58 thereof. In one preferred embodiment, the faceplate 54 is circular and the collar 56 is sized to extend into the recess 36 in the first end wall 30 of the housing 12. The faceplate 54 is also provided with a plurality of spaced apart holes 60 through which the plurality of optical fibers 18 enter the cavity 14. The spaced apart holes 60 are cooperatively sized with the optical fibers 18 to allow relatively free movement of the optical fibers 18 therethrough but are sufficiently small to prevent gel leakage thereacross. The faceplate 54 can be affixed to the housing 12 by known conventional fasteners, such as screws 61. In one embodiment, the screws 61 are inserted into the housing 12 and the faceplate 54 is provided with arced slots 63 having screw clearance openings 65 at the ends 67 thereof. Hence, the faceplate 54 can be interchangeably affixed to the housing 12 by placing the screw clearance openings 65 over the screws 61 and rotating the faceplate 54 into position. Thereafter, the screws 61 can be tightened against the faceplate 54 to secure the faceplate 54 to the housing 12. Preferably, the faceplate 54 is removably affixed to the housing 12 so that different faceplates 54 having different numbers of spaced apart holes 60 can be used as desired. The faceplate 54 and the collar 56 thereof are preferably machined to provide a leak proof seal against the first end wall 30 of the housing 12 to prevent leakage of the gel form the cavity 14. Further, depending upon the viscosity of the gel and the pressure maintained within the cavity 14, seals can also be provided between the faceplate 54 and the first end wall 30 of the housing 12.

In one embodiment, as shown in FIGS. 1 and 3, the means 20 for guiding the optical fibers 18 out of the cavity 14 includes a spline member 62 having an opening 64 therethrough and a plurality of slots 66 extending into the peripheral edge 68 thereof. The spline member 62 is disposed at the second end 32 of the cavity 14. The opening 64, in the preferred embodiment, is axially disposed and sized to accept the plurality of optical fibers 18. The spline member 62 is preferably removable so that a spline member 62 can be selected in accordance with the number of optical fibers 18 traversing the cavity 14. In the preferred embodiment, the opening 64 of the spline member 62 includes a first section 70 proximate the cavity 14 and a die 72 disposed within the first section 70. The die 72 has a comparatively smaller diameter than the first section 70. Such an arrangement allows for gel to be provided about the close bundle of optical fibers 18 formed by the spline member 62. Further, the diameter of the die 72 is substantially smaller than the needle-like tube 86 of the means 28 for injecting the plurality of optical fibers 18 into the extrusion cross head 26. This arrangement allows gel to pass through the slots 66 so that a layer of gel is established and maintained around the close bundle of optical fibers 18. Hence, the close bundle of optical fibers 18 retains the layer of gel through the means 28. During operation, the layer of gel provides a layer of thermal insulation between the plurality of optical fibers 18 and the needle-like tube 86 as it passes through the extrusion cross head 26. In this manner sticking of the optical fibers 18 is avoided.

Figure 4:
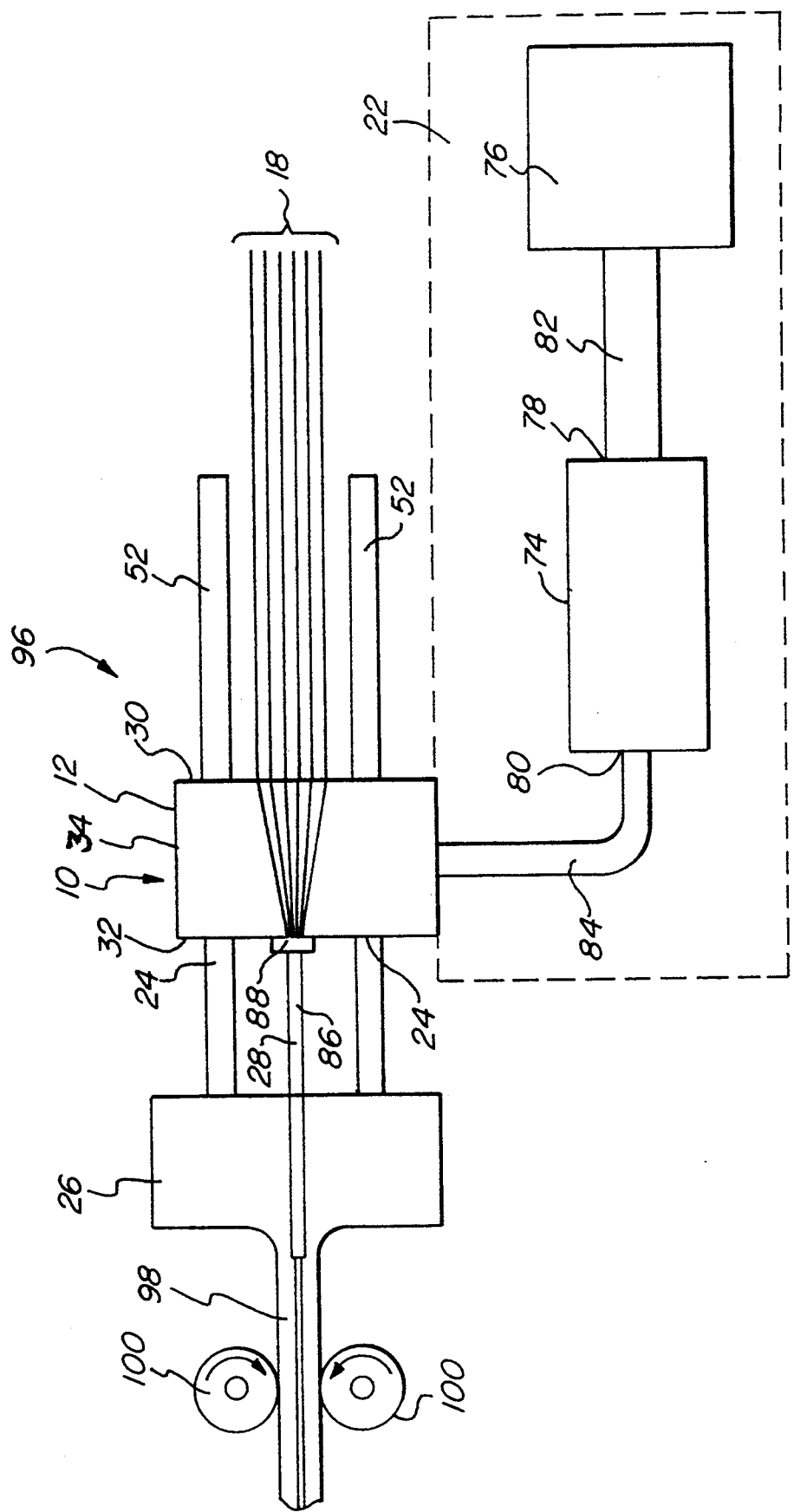
FIG. 4 which is a block diagram of a system for forming a bundle of optical fibers wherein an apparatus embodying the principles of the present invention is particularly useful.

As shown in FIG. 4 the means 22 for injecting gel into the cavity 14 includes a metering pump 74 that communicates with a gel reservoir 76 on the inlet side 78 thereof and the passageway 46 in the housing 12 on the outlet side 80 thereof. In one embodiment, the metering pump 74 is connected to the gel reservoir 76 by an inlet conduit 82 and the passageway 46 by an outlet conduit 84. The connections of the conduits, 82 and 84, are sealed and leak proof by conventional techniques. The metering pump 74 is preferably a gear pump that meters specific amounts of gel into the gel cavity. Typical of such a pump can be a Zenith gear pump rated for about 9 cc/rev. Such a pump is commercially available from the Zenith Pump Division of Parker Hannifin Corp. of Sanford, N.C.

In one embodiment, the means 28 for injecting the plurality of optical fibers 18 into the extrusion cross head 26 includes a needle-like tube 86 affixed at one end 44 thereof to a bushing 88. Preferably, the bushing 88 includes a shaft section 90 having external threads 92 that are cooperatively sized to mate with internal threads 94 formed in the opening 42 of the second end wall 32 of the housing 12. When assembled, the shaft section 90 terminates in the opening 42 proximate the spline member 62. Hence, the plurality of optical fibers 18 pass directly into the tube 86 from the opening 64 of the spline member 62.

A system for bundling a plurality of optical fibers, generally indicated at 96 in FIG. 4, includes the apparatus 10 disposed on the alignment rods 52 such that the needle-like tube 86 extends into the center of the extrusion cross head 26. In operation, the plurality of optical fibers 18 are fed into the cavity 14 via the faceplate 54 and out of the cavity via the die 72 in the spline member 62. From the spline member 62, the plurality of optical fibers 18 are fed into the needle-like tube 86 with a layer of gel about not only each of the optical fibers 18 but between the close bundle of optical fibers 18 and the needle-like tube 86. Thereafter, the apparatus 10 is moved along the alignment rods 52 until the needle-like tube 86 extends into the extrusion cross head 26. The plurality of optical fibers 18, thermally protected by the gel, then pass into an extrusion tube 98 which is disposed, in one embodiment, between opposing drive wheels 100 that pull, or draw, the tube 98 and the plurality of optical fibers 18 therein through the extrusion cross head 26. As the tube 98 exits the extrusion cross head 26 the tube 98 draws down about the plurality of optical fibers 18 to form a close bundle of optical fibers that are subsequently used to form an optical fiber cable. During the drawing process the cavity 14 of the apparatus 10 is provided with a gel from the gel reservoir 76 via the metering pump 74. The gel is provided under a preselected pressure and the amount of gel in the cavity 14 is maintained to ensure that no air gaps are formed about the separated optical fibers 18.

In one particular embodiment, the apparatus 10 as well as the various parts thereof can be machined from any material that is chemically inert to the gel material used. Hence, the apparatus 10 can be made relatively inexpensively while sufficient accuracy and tolerances are maintained. Further, the apparatus 10 has been found to function with gels having a wide range of viscosity, for example, gels having viscosities between 230,000 centapoise and 580,000 centapoise. Such materials, when used in conjunction with the apparatus 10 have been found to not only avoid air gaps within the; cavity 14 but creates a mechanical barrier that eliminates fiber sticking. Further, is has been found that with such a gel fiber tensions were within acceptable limits for the bundling operation. In addition, the fiber bending stresses induced during the bundling operation were quite acceptable. Typically, the insert fiber tension was on order of between 30–40 grams and the exit fiber tension was on the order of between 50–65 grams. The fiber bending stress was on the order of about 2 millibar.

Hence, from the above description it will be understood that the apparatus 10 provides numerous advantages during the formation of optical fiber bundles. For example, the bundles have a significantly reduces number of air gaps therein. The plurality of optical fibers leaving the cavity 14 are very accurately aligned with the extrusion cross head 26 thereby eliminating problems caused by the optical fibers rubbing on the extrusion cross head tooling 26. Still further, it has been found that the extruded tube resulting from use of the apparatus 10 has a more consistent diameter thus making the optical fiber cables more consistent.

Although the present invention has been described with respect to a specific embodiment it will be understood that other configurations and arrangements can also be made that do not depart from the spirit and scope of the description set forth herein. Hence, the present invention is deemed limited only by the appended claims and the reasonable interpretation thereon.

What is claimed is:

1. An apparatus for applying gel to a plurality of optical fibers, comprising:
    a housing, said housing having a cavity therein, said cavity having a first end terminating proximate a first end wall of said housing and a second end terminating within said housing;
    means, disposed at said first end of said cavity, for separating a plurality of optical fibers entering into said cavity;
    means, disposed at said second end of said cavity, for guiding said optical fibers out of said cavity, said means for guiding said optical fibers out of said cavity includes a spline member having an opening therethrough, said spline member being disposed at said second end of said cavity, said opening in said spline member being sized to accept said plurality of optical fibers such that a close bundle is formed, said spline member further including a plurality of slots extending about a peripheral edge thereof; and
    means for injecting a gel into said cavity such that each said optical fiber is coated with said gel.

2. The apparatus as claimed in claim 1 wherein said cavity has a circular cross-section along the length thereof.

3. The apparatus as claimed in claim 2 wherein said cavity has a comparatively larger cross-section at said first end thereof and a comparatively smaller cross-section at said second end thereof.

4. The apparatus as claimed in claim 3 wherein said cavity is linearly tapered between said first and second ends thereof.

5. The apparatus as claimed in claim 1 wherein said means for separating said optical fibers includes a faceplate having a plurality of spaced apart holes therethrough, each of said spaced apart holes being cooperatively sized to allow one of said optical fibers to pass therethrough.

6. The apparatus as claimed in claim 5 wherein said faceplate includes a collar, said collar being cooperatively sized to extend into a recess in said first end wall of said housing, said recess terminating at said first end of said cavity.

7. The apparatus as claimed in claim 5 further including means for removably affixing said faceplate to said housing.

8. The apparatus as claimed in claim 1 wherein said opening of said spline member is axially disposed in said spline member.

9. The apparatus as claimed in claim 1 wherein said opening of said spline member includes a first section proximate said cavity and a die disposed within said first section.

10. The apparatus as claimed in claim 9 wherein said first section has a comparatively larger diameter than said die.

11. The apparatus as claimed in claim 1 with said opening of said spline member being axially disposed in said spline member; and
    a first section proximate said cavity and a die disposed within said first section, said first section having a comparatively larger diameter than said die.

12. The apparatus as claimed in claim 1 wherein said housing includes a passageway extending from a side wall thereof to said cavity;
    said means for injecting gel into said cavity includes a gel pump, said gel pump communicating with a gel reservoir on the outlet side thereof and said passageway on the outlet side thereof.

13. The apparatus as claimed in claim 12 further including a pump inlet conduit extending from said reservoir to said inlet side of said pump and an outlet conduit extending from said outlet side of said pump to said passageway in said housing.

14. The apparatus as claimed in claim 12 when said gel pump is a metering pump.

15. The apparatus as claimed in claim 12 when said gel pump is a gear pump.

16. The apparatus as claimed in claim 1 further comprising:
    means for aligning said housing with an extrusion cross head.

17. The apparatus as claimed in claim 1 further comprising means for injecting said plurality of optical fibers into an extrusion cross head.

18. The apparatus as claimed in claim 17 wherein said means for injecting said plurality of optical fibers into said extrusion cross head includes a tube, said tube terminating at one side thereof proximate said means for guiding said optical fibers out of said cavity.

19. The apparatus as claimed in claim 17 with said opening of said spline member being axially disposed in said spline member and including a first section proximate said cavity and a die disposed with said first section, said first section having a comparatively larger diameter than said die.

20. The apparatus as claimed in claim 18 wherein said means for injecting said plurality of optical fibers into said extrusion cross head further includes a bushing affixed to said one end of said tube, said bushing including an externally threaded shaft section cooperatively sized to mate with an internally threaded opening in said housing.

21. An apparatus as claimed in claim 1 further comprising:
   means for aligning said housing with an extrusion cross head; and
   means for injecting said plurality of optical fibers into an extrusion cross head.

22. An apparatus for applying gel to a plurality of optical fibers, comprising:
   a housing, said housing having a cavity therein, said cavity having a first end terminating proximate a first end wall of said housing and a second end terminating within said housing wherein said housing includes a passageway extending from a side wall thereof to said cavity;
   means, disposed at said first end of said cavity, for separating a plurality of optical fibers entering into said cavity;
   means, disposed at said second end of said cavity, for guiding said optical fibers out of said cavity, said means for guiding said optical fibers out of said cavity includes a spline member having an opening therethrough, said spline member being disposed at said second end of said cavity, said opening in said spline member being sized to accept said plurality of optical fibers such that a close bundle is formed, said spline member further including a plurality of slots extending about a peripheral edge thereof;
   means for injecting a gel into said cavity such that each said optical fiber is coated with said gel, said means for injecting gel into said cavity includes a gel pump, said gel pump communicating with a gel reservoir on the inlet side thereof and said passageway on the outlet side thereof;
   means for aligning said housing with an extrusion cross head; and
   means for injecting said plurality of optical fibers into said extrusion cross head.

23. A system for forming a close bundle of optical fibers, said system comprising:
   a housing, said housing having a cavity therein, said cavity having a first end terminating proximate a first end wall of said housing and a second end terminating within said housing wherein said housing includes a passageway extending from a side wall thereof to said cavity;
   means, disposed at said first end of said cavity, for separating a plurality of optical fibers entering into said cavity;
   means, disposed at said second end of said cavity, for guiding said optical fibers out of said cavity, said means for guiding said optical fibers out of said cavity includes a spline member having an opening therethrough, said spline member being disposed at said second end of said cavity, said opening in said spline member being sized to accept said plurality of optical fibers such that a close bundle is formed, said spline member further including a plurality of slots extending about a peripheral edge thereof;
   means for injecting a gel into said cavity such that each said optical fiber is coated with said gel, said means for injecting gel into said cavity includes a gel pump, said gel pump communicating with a gel reservoir on the inlet side thereof and said passageway on the outlet side thereof;
   means for aligning said housing with an extrusion cross head;
   means for injecting said plurality of optical fibers into said extrusion cross head, said extrusion cross head applying a tube about said plurality of optical fibers; and
   means for drawing said tube and said plurality of optical fibers through said extrusion cross head.

24. A method for applying gel to a plurality of optical fibers, said method comprising the steps of:
   separating a plurality of optical fibers entering into a first end of a cavity in a housing;
   guiding said optical fibers out of a second end of said cavity, said guiding step including guiding said fibers through a spline member having an opening therethrough, said spline member being disposed at said second end of said cavity, said opening in said spline member being sized to accept said plurality of optical fibers such that a close bundle is formed, said spline member further including a plurality of slots extending about a peripheral edge thereof; and
   injecting a gel into said cavity such that each said optical fiber is coated with said gel.

25. The method as claimed in claim 24 further comprising the steps of:
   aligning said housing with an extrusion cross head;
   injecting said plurality of gel coated optical fibers into an extrusion cross head, said extrusion cross head applying a tube about said plurality of optical fibers.

26. The method as claimed in claim 25 further comprising the step of:
   drawing said tube and said plurality of optical fibers through said extrusion cross head.

* * * * *